Jan. 9, 1923.
A. HART.
TURNING ATTACHMENT FOR AUTOMOBILES.
FILED AUG. 2, 1921.
1,441,419.
2 SHEETS—SHEET 1.
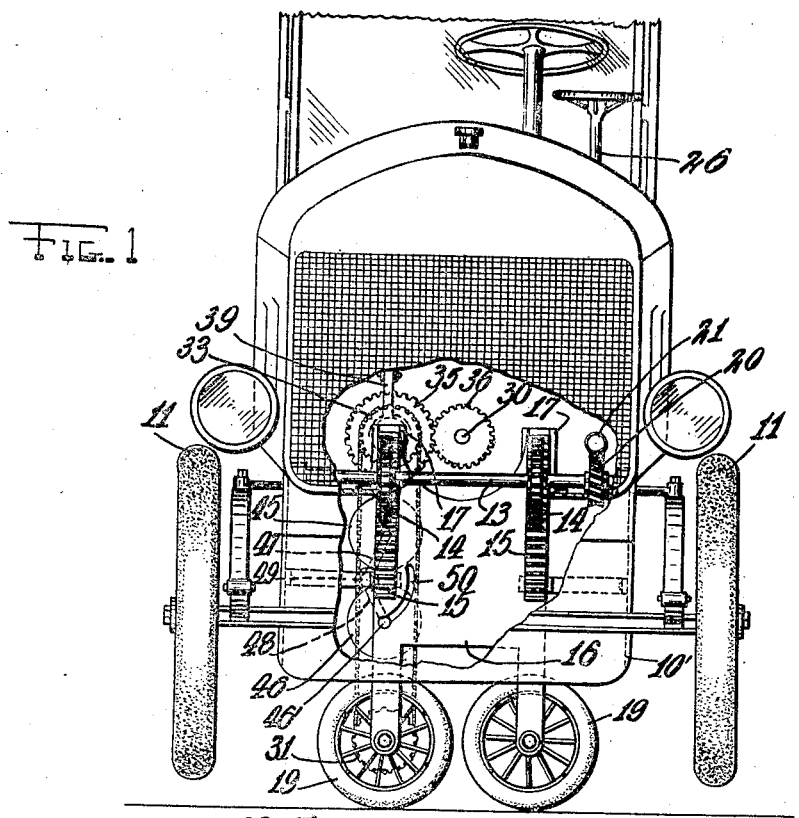
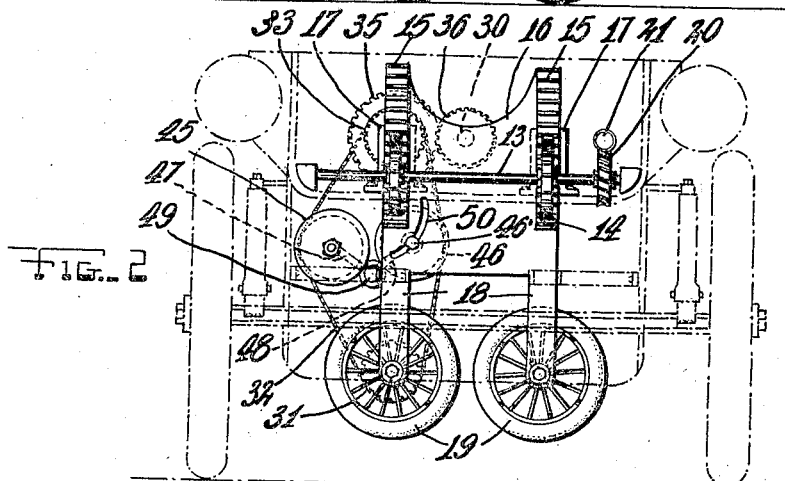
Inventor
Adolph Hart
By [signature]
Attorney Jan. 9, 1923.
A. HART.
TURNING ATTACHMENT FOR AUTOMOBILES.
FILED AUG. 2, 1921.
1,441,419.
2 SHEETS—SHEET 2.
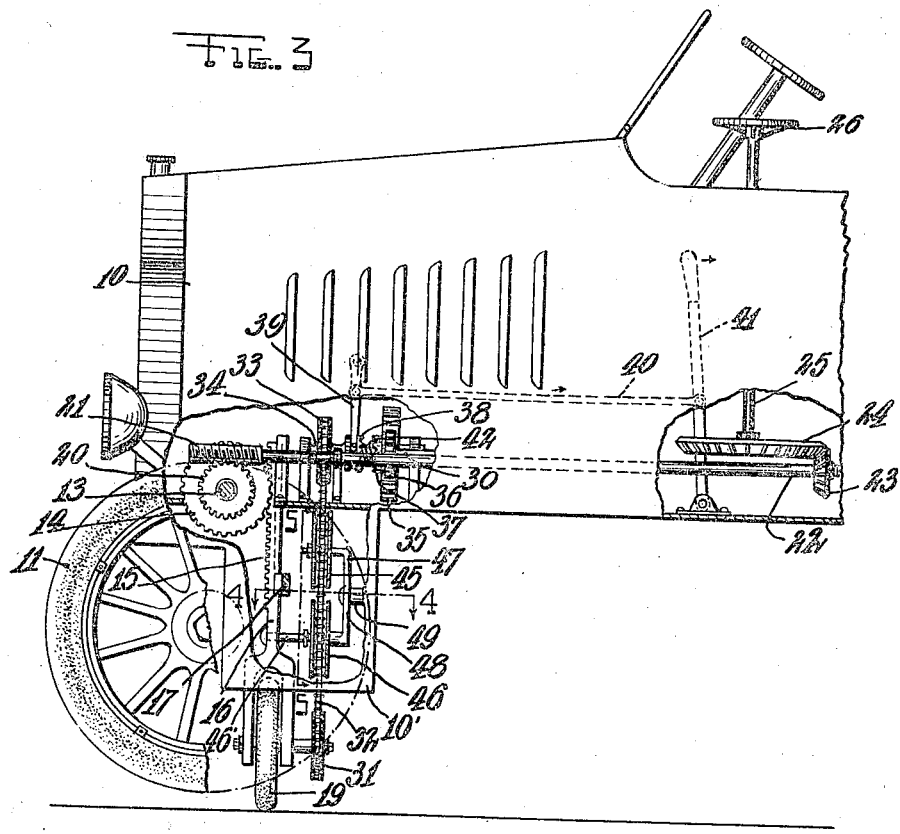
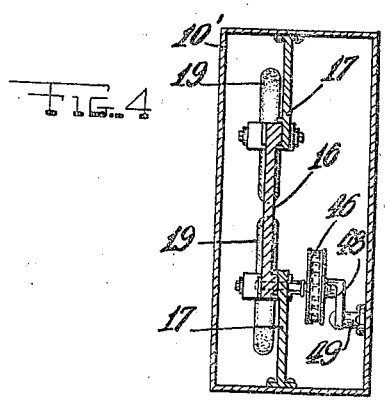
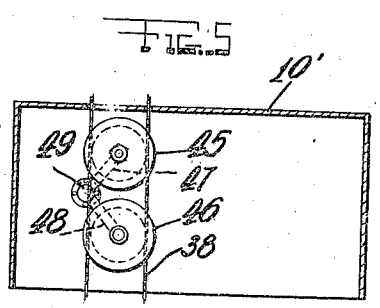
Inventor
Adolph Hart
By *[signature]*
Attorney Patented Jan. 9, 1923.

1,441,419

UNITED STATES PATENT OFFICE.

ADOLPH HART, OF NEW YORK, N. Y.

TURNING ATTACHMENT FOR AUTOMOBILES.

Application filed August 2, 1921. Serial No. 489,270.

*To all whom it may concern:*

Be it known that I, ADOLPH HART, citizen of Hungary, residing at New York, in the county of New York and State of New York, have invented certain new and useful Improvements in Turning Attachments for Automobiles, of which the following is a specification.

This invention relates to a turning attachment for automobiles, adapted to enable the automobile to be quickly and easily turned completely around in a narrow space, such as a narrow street or a road or a garage, without requiring any backing up of the automobile.

The invention has for a general object to provide an attachment for the above outlined purpose.

More specifically speaking the invention has for an object a turning attachment arranged so that the front wheels of the automobile may be lifted and the latter swung around on its rear wheels.

For further comprehension of the invention, and of the objects and advantages thereof, reference will be had to the following description and accompanying drawings, and to the appended claims in which the various novel features of the invention are more particularly set forth.

Fig. 1 of the drawings is a front view, with parts broken away, of an automobile equipped with the invention, showing the attachment in operative position.

Fig. 2 is a front view of the attachment, indicating the automobile in dot and dash lines, the attachment being shown in its raised or inoperative position with respect to the automobile.

Fig. 3 is a side view, with parts broken away, showing the attachment in the same position as Fig. 1.

Fig. 4 is a detail horizontal section on the line 4—4 of Fig. 3.

Fig. 5 is a detail transverse vertical section on the line 5—5 of Fig. 3 and showing particularly the drive chain tensioning device.

Referring now to the drawings 10 indicates the forward portion of an automobile body of ordinary construction, and 11 the front wheels. Suitably mounted in the automobile frame, above the front axle is a transverse shaft 13 which carries a pair of spur gears 14 meshing with vertical racks 15 formed on a vertical transverse plate 16, the guide elements for this plate 16 being indicated generally at 17. The plate 16 has a pair of downwardly extending forked legs 18 in which are mounted a pair of small wheels 19 arranged transversely to the automobile. Shaft 13 is adapted for rotation, to raise or lower the turning wheels 19, by means of a worm gear 20, thereon engaged by a worm pinion 21 on the front end of a longitudinal shaft 22 to the rear end of which is fixed a bevel pinion 23 meshing with a bevel gear 24 fixed on the lower end of a vertical shaft 25 whose upper end has a handwheel 26 fixed thereon. These shafts 22 and 25 may be supported in any suitable manner, the shaft 25 being so located as to have the handwheel 26 within easy reach of the driver of the automobile. It will be apparent that wheels 19 may be raised or lowered by rotating handwheel 26.

One of the wheels 19 is arranged to have a drive connection with the engine shaft, indicated at 30. As here shown, the axle of this wheel has fixed thereto a sprocket wheel 31 over which is looped a sprocket chain 32 which is looped also over a second sprocket wheel 33 on a longitudinal stub shaft 34 suitably supported in the automobile. Loose on this shaft 34 is a gear 35 meshing with a smaller gear 36 on the engine shaft 30. Fixed to the gear 35 is a clutch element 37 adapted for engagement by a clutch collar 38 feathered on shaft 34. This clutch collar 38 is shifted to operative position by means of a yoke lever 39 which engages the same in the usual manner and is connected by a link 40 with a hand lever 41. A spring 42 normally holds the clutch collar 38 in inoperative position.

To prevent the chain 32 from disengaging from the sprocket wheel 31 when the wheels 19 are raised I provide a pair of flanged idler pulleys 45, 46 which are located between the two reaches of the chain. These pulleys are mounted on the outer ends of a pair of rigidly connected and angularly disposed arms 47, 48 pivoted as indicated at 49 to a box like member 10' depending from the body 10. The pulley 46 has a projecting trunnion 46' which engages in a curved slot 50 in the plate 16.

Normally the wheels 19 occupy the raised position shown in Fig. 2 of the drawings. When the automobile is to be turned around the handwheel 26 is rotated thus lowering wheels 19 and lifting the front wheels 11 off the ground, as indicated in Figs. 1 and 3. Lever 41 is then pulled, operatively engaging gears 35 with stub-shaft 34 to which is fixed the sprocket wheel 33. The wheel 19 to which the other sprocket wheel 31, is attached is thus caused to rotate, the front end of the automobile is thus caused to swing around, the rear wheels acting as a pivot, until the automobile is facing in the desired direction. When handwheel 26 is again rotated to raise the wheels 19 the engagement of the idler trunnion 46' in the slot 50, which latter moves with plate 16, causes the idler pulleys 45 and 46 to be swung laterally, thus spreading apart the two reaches of the chain 32 and holding it in engagement with the sprocket wheel 31.

Having thus described my invention what I claim as new and desire to protect by Letters Patent of the United States is as follows:—

1. A take-up mechanism comprising a vertically guided member, means for moving said member vertically, a part to be rotated carried by said member, drive means including a belt-like device for rotating said part, an idler pulley engaging said chain, a lever on which said idler pulley is mounted, and a part on said lever operatively engaging in a slot in said vertically guided member whereby vertical movement of the member imparts lateral movement to said idler pulley.

2. A take-up mechanism comprising a vertically guided member having a slot therein extending at an oblique angle to its line of movement, means for moving said member vertically, a part to be rotated carried by said member, drive means including a sprocket chain for rotating said part, a pair of idler pulleys located between the reaches of said chains, a bell crank lever on the ends of which said pulleys are located, and a stud arm engaging in a slot in the said plate, for the purpose set forth.

In testimony whereof I have affixed my signature.

ADOLPH HART.